United States Patent
Krallis et al.

(10) Patent No.: US 11,208,507 B2
(45) Date of Patent: Dec. 28, 2021

(54) METHOD, AN ARRANGEMENT AND USE OF AN ARRANGEMENT FOR OLEFIN POLYMERISATION

(71) Applicant: Borealis AG, Vienna (AT)

(72) Inventors: Apostolos Krallis, Porvoo (FI); Vasileios Kanellopoulos, Linz (AT)

(73) Assignee: Borealis AG, Vienna (AT)

(*) Notice: Subject to any disclaimer, the term of this patent is extended or adjusted under 35 U.S.C. 154(b) by 41 days.

(21) Appl. No.: 16/606,274

(22) PCT Filed: Jun. 15, 2018

(86) PCT No.: PCT/EP2018/065941
§ 371 (c)(1),
(2) Date: Oct. 18, 2019

(87) PCT Pub. No.: WO2018/234176
PCT Pub. Date: Dec. 27, 2018

(65) Prior Publication Data
US 2020/0291143 A1    Sep. 17, 2020

(30) Foreign Application Priority Data

Jun. 20, 2017 (EP) ..................... 17176798

(51) Int. Cl.
*C08F 10/02* (2006.01)
*C08F 2/34* (2006.01)
(Continued)

(52) U.S. Cl.
CPC ............ *C08F 10/02* (2013.01); *B01J 8/1809* (2013.01); *B01J 8/1827* (2013.01); *B01J 8/1845* (2013.01)

(58) Field of Classification Search
None
See application file for complete search history.

(56) References Cited

U.S. PATENT DOCUMENTS 3,324,093 A    6/1967 Alleman
3,405,109 A    10/1968 Rohlfing
(Continued)

FOREIGN PATENT DOCUMENTS

EP    45976 A2    2/1982
EP    45977 A2    2/1982
(Continued)

OTHER PUBLICATIONS

Examination Report of Indian Patent Application No. 201917050494, dated Jul. 28, 2020, 6 pages.
(Continued)

*Primary Examiner* — Fred M Teskin
(74) *Attorney, Agent, or Firm* — Lowenstein Sandler LLP (57) ABSTRACT

An olefin polymerisation method and arrangement comprising polymerising at least one olefin in gas phase in a fluidised bed in the presence of an olefin polymerisation catalyst in a polymerisation reactor having a vertical body; a generally conical downwards tapering bottom zone; a generally cylindrical middle zone, above and connected to said bottom zone; and a generally conical upwards tapering top zone above and connected to said middle zone wherein (i) fluidisation gas is introduced to the bottom zone of the reactor from where it passes upwards through the reactor; (ii) the fluidisation gas is withdrawn from the top zone of the reactor; (iii) a fluidised bed is formed within the reactor where the growing polymer particles are suspended in the upwards rising gas stream; and wherein the polymerisation reactor has an operating temperature set point and which reactor comprises at least one temperature measurement sensor, wherein a temperature difference (DT) between the temperature measurement sensor (Tm), and the operating temperature set point (Ts) of the reactor is equal to or less than 10° C.

14 Claims, 1 Drawing Sheet

(51) Int. Cl.
    *B01J 8/18*  (2006.01)
    *B01J 8/24*  (2006.01)

(56) References Cited

U.S. PATENT DOCUMENTS

| | | | |
|---|---|---|---|
| 4,107,414 | A | 8/1978 | Giannini et al. |
| 4,186,107 | A | 1/1980 | Wagner |
| 4,226,963 | A | 10/1980 | Giannini et al. |
| 4,347,160 | A | 8/1982 | Epstein et al. |
| 4,382,019 | A | 5/1983 | Greco |
| 4,435,550 | A | 3/1984 | Ueno et al. |
| 4,465,782 | A | 8/1984 | McKenzie |
| 4,472,524 | A | 9/1984 | Albizzati |
| 4,473,660 | A | 9/1984 | Albizzati et al. |
| 4,522,930 | A | 6/1985 | Albizzati et al. |
| 4,530,912 | A | 7/1985 | Pullukat et al. |
| 4,532,313 | A | 7/1985 | Matlack |
| 4,560,671 | A | 12/1985 | Gross et al. |
| 4,581,342 | A | 4/1986 | Johnson et al. |
| 4,582,816 | A | 4/1986 | Miro |
| 4,621,952 | A | 11/1986 | Aronson |
| 4,657,882 | A | 4/1987 | Karayannis et al. |
| 5,391,654 | A | 2/1995 | Ahvenainen et al. |
| 8,765,885 | B2 | 7/2014 | Bell |
| 9,023,958 | B2 * | 5/2015 | Wright ............... B01J 7/00 526/88 |
| 2010/0286346 | A1 | 11/2010 | Muhle |

FOREIGN PATENT DOCUMENTS

| | | | |
|---|---|---|---|
| EP | 47077 | A1 | 3/1982 |
| EP | 188125 | A2 | 7/1986 |
| EP | 250169 | A2 | 12/1987 |
| EP | 372239 | A2 | 6/1990 |
| EP | 479186 | A2 | 4/1992 |
| EP | 579426 | A1 | 1/1994 |
| EP | 683176 | A1 | 11/1995 |
| EP | 688794 | A1 | 12/1995 |
| EP | 810235 | A2 | 12/1997 |
| EP | 887380 | A1 | 12/1998 |
| EP | 0906782 | A1 | 4/1999 |
| EP | 802202 | B1 | 10/1999 |
| EP | 1415999 | A1 | 5/2004 |
| EP | 1538167 | A1 | 6/2005 |
| EP | 1600276 | A1 | 6/2005 |
| EP | 1739103 | A1 | 1/2007 |
| EP | 1752462 | A1 | 2/2007 |
| EP | 1860125 | A1 | 11/2007 |
| EP | 2330135 | A1 | 6/2011 |
| EP | 2495037 | A1 | 9/2012 |
| EP | 2495038 | A1 | 9/2012 |
| EP | 2594433 | A1 | 5/2013 |
| EP | 2890490 | A1 | 7/2015 |
| EP | 2913345 | A1 | 9/2015 |
| EP | 2913346 | A1 | 9/2015 |
| EP | 3103818 | A1 | 12/2016 |
| GB | 1580635 | A | 2/1921 |
| GB | 1272778 | A | 5/1972 |
| TW | 200902558 | A | 1/2009 |
| WO | 9212182 | A1 | 7/1992 |
| WO | 9512622 | A1 | 5/1995 |
| WO | 9532994 | A1 | 12/1995 |
| WO | 9618662 | A1 | 6/1996 |
| WO | 9632423 | A1 | 10/1996 |
| WO | 9728170 | A1 | 8/1997 |
| WO | 9832776 | A1 | 7/1998 |
| WO | 9166610 | A1 | 12/1998 |
| WO | 9858976 | A1 | 12/1998 |
| WO | 9858977 | A1 | 12/1998 |
| WO | 9951646 | A1 | 10/1999 |
| WO | 9961489 | A1 | 12/1999 |
| WO | 0029452 | A1 | 5/2000 |
| WO | 0155230 | A1 | 8/2001 |
| WO | 02088194 | A1 | 11/2002 |
| WO | 03010208 | A1 | 2/2003 |
| WO | 03051514 | A1 | 6/2003 |
| WO | 03051934 | A2 | 6/2003 |
| WO | 2003106510 | A1 | 12/2003 |
| WO | 2004085499 | A2 | 10/2004 |
| WO | 2005118655 | A1 | 12/2005 |
| WO | WO 2015/128470 | A1 * | 9/2015 ............... C08F 2/01 |

OTHER PUBLICATIONS

Office Action for Korean Patent Application No. 10-2019-7035431 dated Nov. 17, 2020 and English Translation Thereof, 11 pages.
English Translation of Office Action for TW Application No. 107120662 dated Jan. 9, 2019, 6 pages.
Kirk-Othmer, Encyclopedia of Chemical Technology, 2nd edition (1966), vol. 10, pp. 340-342,3 pages.
International Search Report for PCT PCT/EP2018/065941 dated Aug. 21, 2018, 11 pages.
Geldart, "Gas-Fluidization Technology", vol. 42, 1986, 24 pages.

* cited by examiner

METHOD, AN ARRANGEMENT AND USE OF AN ARRANGEMENT FOR OLEFIN POLYMERISATION

CROSS-REFERENCE TO RELATED APPLICATION(S)

This application is a national phase of International Application No. PCT/EP2018/065941, filed on Jun. 15, 2018, which claims the benefit of European Patent Application No. 17176798.1, filed on Jun. 20, 2017. The contents of these applications are hereby incorporated by reference in their entirety.

FIELD OF THE INVENTION

The present invention relates to a method, an arrangement and use of the arrangement for olefin polymerisation.

BACKGROUND OF THE INVENTION

Conventional fluidised bed reactors, i.e. bubbling gas phase olefin polymerisation reactors are known in the art. They typically operate under moderate superficial gas velocity values, especially for polyethylene production, in order to secure that sufficient gas-solids mixing efficiency is achieved and the solids carryover/entrainment phenomena is limited. Typical superficial gas velocity values used, typically for polyethylene, are 0.35-0.5 m/s and for polypropylene, 0.40-0.70 m/s. However, depending on the polymer grade to be produced, a number of operability issues could be encountered with relating to quality of the fluidisation, solids segregation and bed homogeneity. Also handling of large size agglomerates can be very demanding in conventional gas phase reactors. One of the biggest challenges in the conventional gas phase olefin polymerisation reactors is the high risk of experiencing operability issues when significant fraction of large size polymer particles (i.e. larger than 1000 µm) are present. Typically this large size fraction of polymer particles, especially in gas phase reactor conditions has a tendency to form agglomerates due to insufficient heat removal, which quite often results in operational discrepancies. In particular large and active polymer particles entering a gas phase reactor have a high tendency to experience particle overheating leading to partly softening on their surface and to increased stickiness. Softening on the surface results in increased stickiness which in turn leads to formation of agglomerates.

There is a rising demand on the market to develop multi-modal polymer grades, especially polyethylene grades by incorporating more comonomer content in the gas phase reactor. However, this is challenging due to the limitation in comonomer incorporation in the polymer caused by the limited heat transfer rate from the polymer particles to the fluidisation gas in the gas phase reactor. This is especially challenging when large size polymer particles are involved.

Reactor assemblies and methods relating thereto with a so called "double cone reactor structure" have been presented for example in EP2495037, EP2495038, EP2913346, EP2913345, EP2890490, EP 3103818. However, none of these relate to a method, arrangement or use of the arrangement for enhancing heat transfer rate from polymer particles to a gas medium, i.e. fluidisation gas.

BRIEF DESCRIPTION OF THE INVENTION

An object of the present invention is to provide a method, an arrangement and use of the arrangement for preparing polymer, wherein heat transfer rate from polymer particles to fluidisation gas is enhanced. The objects of the invention are achieved by a method and an arrangement, which are characterized by what is stated in the independent claims. The preferred embodiments of the invention are disclosed in the dependent claims.

The invention is based on the idea of employment of a special fluidised bed reactor structure, i.e. a so called double cone reactor, comprising at least one temperature measurement sensor and a reactor operating temperature set point, wherein a temperature difference (DT) between the temperature of the temperature measurement sensor and the reactor operating temperature set point is equal to or less than 10° C. This is especially important when the particle size $d_{90}$ of the material in the reactor is equal to or above 700 µm.

An advantage of the present invention due to the slugging/entrained fluidisation conditions inside the polymerisation reactor is that the heat is removed more efficiently from the reactor compared to a conventional gas phase reactor. Slugging fluidisation means when the size of the bubbles is greater than about one third of the vessel cross-section. The rise velocity of the bubbles is controlled by the vessel and they become slugs of gas. The increased heat removal rate from the polymer particles to the gas medium, i.e. fluidisation gas and the fact that the temperature difference between (any of) the temperature measurement sensor(s) and the reactor operating temperature set point is equal to or less than 10° C., leads to less particle overheating for same polymer particle size in the polymerisation reactor of the present invention compared to conventional gas phase reactor. This results further in reduced particle stickiness due to reduced softening of the polymer particles and thus, less particle agglomeration which is the major limitation for the operation of gas phase reactors. Thus, with the present invention, i.e. a polymerisation reactor with a double cone reactor structure and temperature difference of equal to or less than 10° C. between any of the temperature measurement sensors and the reactor operating temperature set point, polymer grades may contain large fraction of large size particles without experiencing operability issues.

A further advantage of the present invention is that easier handling and increased flowability of large size polymer particles is achieved, which large size polymer particles would normally cause agglomeration in conventional gas phase reactors.

A further advantage of the present invention is that the reduced stickiness and overall agglomeration of the particulate material makes the handling of the product in subsequent surge and purge bins units easier. In the opposite case where large size particles and agglomerates are present during the downstream processing, the high molecular weight hydrocarbons (i.e., propane, 1-butene and 1-hexene) cannot be sufficiently removed and a significant amount stays in the polymer particles, thus not meeting product properties requirements, especially for film applications where organoleptic properties are important.

A further advantage of the present invention is that higher activity catalysts with increased comonomer incorporation can be handled in double cone reactor method and arrangement of the present invention compared to conventional gas phase reactors.

A further advantage of the present invention is that in a multi-stage reactor process comprising a loop and a gas-phase reactor in series (i.e., Borstar process) a higher gas-phase reactor polymer production split compared to the loop reactor can be achieved in the present invention compared to conventional gas phase reactors. This is because in the current invention the double cone reactor design combined with the superior hydrodynamic conditions (increased superficial gas velocity) and enhanced gas-solids mixing conditions results in increased heat transfer rates from the growing polymer particles to the fluidisation gas. Thus, it is possible to operate the double cone reactor under increased monomer partial pressure, keeping the same monomer/comonomer molar ratio, compared to conventional gas phase reactor. This substantially increases the productivity of the double cone reactor compared to the productivity of the loop reactor, increasing thus the gas-phase reactor production split in a multi-stage reactor configuration process, e.g., loop reactors followed by gas phase reactor, series of gas phase reactors, etc. Higher split in the gas phase reactor has the advantage of producing multi-modal polymer grades with specific product quality specifications for advanced end-use applications in packaging, films, blow molding, etc. of. The present invention also enables operating the process at higher production throughput for the same multimodal polymer grade compared to a conventional fluidised bed reactor.

BRIEF DESCRIPTION OF THE FIGURES

In the following the invention is described in more detail by means of preferred embodiments with reference to the attached drawings, in which The FIGURE is a flow diagram of an example embodiment of the invention.

DETAILED DESCRIPTION OF THE INVENTION

Figure 1:
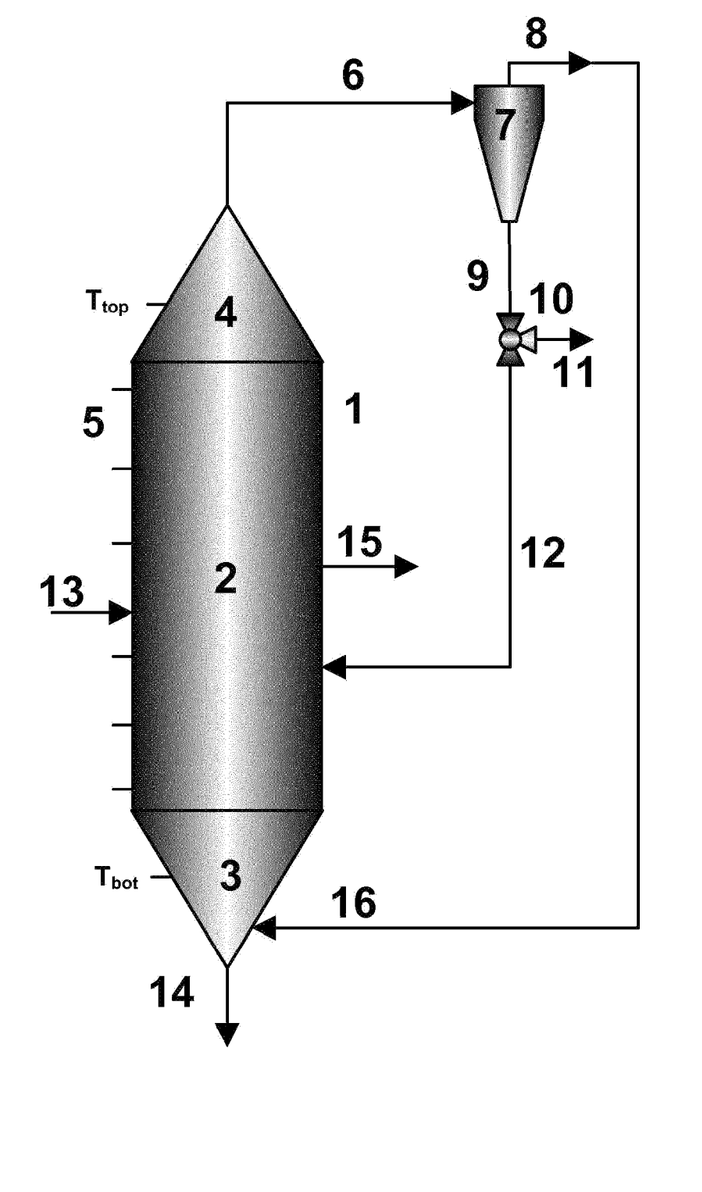

The present invention relates to an olefin polymerisation method comprising polymerising at least one olefin in gas phase in a fluidised bed in the presence of an olefin polymerisation catalyst in a polymerisation reactor having a vertical body; a generally conical downwards tapering bottom zone; a generally cylindrical middle zone, above and connected to said bottom zone; and a generally conical upwards tapering top zone above and connected to said middle zone wherein (i) fluidisation gas is introduced to the bottom zone of the reactor from where it passes upwards through the reactor; (ii) the fluidisation gas is withdrawn from the top zone of the reactor; (iii) a fluidised bed is formed within the reactor where the growing polymer particles are suspended in the upwards rising gas stream; and wherein the polymerisation reactor has an operating temperature set point and which polymerisation reactor comprises at least one temperature measurement sensor, wherein a temperature difference (DT) between the temperature measurement sensor (Tm) and the operating temperature set point (Ts) of the reactor is equal to or less than 10° C.

In other words, a temperature difference (DT) between the temperature measurement sensor (Tm), and the operating temperature set point (Ts) of the reactor is equal to or less than 10° C., thus fulfilling the following equation DT=Tm−Ts≤10° C.

Typically the temperature difference DT is 0-10° C. Preferably the temperature difference DT is 0-9.4° C.

The present invention also relates to an olefin polymerisation apparatus comprising a polymerisation reactor for polymerising at least one olefin in gas phase in a fluidised bed in the presence of an olefin polymerisation catalyst, the reactor having a vertical body; a generally conical downwards tapering bottom zone; a generally cylindrical middle zone, above and connected to said bottom zone; and a generally conical upwards tapering top zone above and connected to said middle zone wherein (i) means for introducing fluidisation gas to the bottom zone of the reactor from where it passes upwards through the reactor; (ii) means for withdrawing the fluidisation gas from the top zone of the reactor; (iii) a fluidised bed within the reactor where the growing polymer particles are suspended in the upwards rising gas stream; and wherein the polymerisation reactor has an operating temperature set point and which polymerisation reactor comprises at least one temperature measurement sensor, wherein a temperature difference (DT) between the temperature measurement sensor and the operating temperature set point is equal to or less than 10° C.

The following definitions apply to the method, apparatus (arrangement) and use of the apparatus.

In the method and apparatus of the invention the polymerisation reactor comprises polymer particles having a $d_{90}$ of equal to or more than 700 μm.

The temperature difference between the temperature measurement sensor and the reactor operating temperature set point gives an indication of temperature difference between a polymer particle surface and the fluidisation gas in the polymerisation reactor. Typically the reactor has from 2 to 20 temperature measurement sensors, more typically from 6 to 12. The temperature measurement sensor means in this connection any suitable means for measuring temperature inside the reactor, for example sensors, probes etc. Examples of those are well known to persons skilled in the art. The reactor typically comprises at least two temperature measurement sensors meaning that there may be a number of temperature measurement sensors in the reactor, not necessarily evenly divided, and the temperature difference between any of the temperature measurement sensors, i.e. points of measurement, and the reactor operating temperature set point is equal to or less than 10° C. The temperature difference of equal to or less than 10° C. between any of the temperature measurement sensors and the reactor operating temperature set point indicates that the temperature difference between polymer particle surface and fluidisation gas in the reactor is at a suitable level to avoid any operability issues, as discussed earlier. The method of the present invention relates to steady state operation and/or to operation during grade transition(s).

The "operating temperature set point" of the reactor or "the reactor operating temperature set point" is pre-determined and depends on the recipe of the polymer grade to be produced. For example for polyethylene the reactor operating temperature set point is typically from 75 to 95° C., and for polypropylene from 75 to 90° C. A person skilled in the art is able to choose a suitable set point for the method.

In conventional fluidised bed reactors there is a limitation of the heat transferred from the polymer particles to the gas medium. Depending on the operating conditions (e.g., superficial gas velocity, mixing intensity, comonomer partial pressure, polymer particle size, etc.) the heat transfer limitation can lead to particle overheating, softening and, thus, agglomeration. In order to avoid the particle overheating and agglomeration, there is an upper limit of the comonomer partial pressure, for a given catalyst system and a limit of the comonomer which is incorporated in the polymer.

In the present invention, the hydrodynamic conditions which determine the gas-solid mixing efficiency are more enhanced due to the reactor design as well as to the higher superficial gas velocities that can be reached compared to the conventional gas phase reactor. In a gas-phase olefin polymerisation reactor the growing polymer particles exhibit internal and external mass and heat transfer limitations. At the surface of the growing polymer particles a gaseous boundary layer is formed which causes the external heat and mass transfer limitations. The particle to particle interactions are increased in the proposed reactor resulting in frequent renewable of the external boundary layer of the polymer particles which leads to significantly less external heat and mass transfer limitations around the growing polymer particles. This is extremely important since the tendency of particle overheating (i.e., the temperature difference between the particles and the gas phase) is substantially less, thus, less particle agglomeration phenomena. In conventional gas phase reactors it is not possible to increase the superficial gas velocity to a value which is compared to the one employed in the proposed reactor due to uncontrolled solids carry over (entrainment) which can lead to polymer build up in the surfaces of the disengagement zone (upper expansion part of the reactor) as well as to significant fouling of heat exchangers and compressor units.

The proposed gas phase reactor set up enables better control of the reactor temperature through manipulation of the superficial gas velocity, it exhibits enhanced mixing characteristics and it can handle polymer material of low densities (lower than 902 Kg/m$^3$) due to enhanced powder flowability features. It also allows full control of particle flow throughout the reactor assembly and largely contributes in producing polymer particles with increased homogeneity (same material quality is produced in each zone of the reactor).

The partial pressure of the individual components that co-exist in the gas-phase reactor is calculated by multiplying the mole fraction of the individual gaseous components of the mixture with the overall reactor pressure.

The reactor has typically a height to diameter ratio L/D of at least 4, more typically at least 5, most typically in the range of 4 to 6. In the reactor of the present method there is no fluidisation grid in the reactor. This has the advantage of collecting and removing any possibly formed agglomerate during the operation of the reactor. Furthermore, the maintenance and cleaning of the reactor can be performed much faster while the corresponding costs are lower compared to conventional gas-phase reactors.

Typically, there is no fluidisation grid in the reactor. The fluidisation gas is typically withdrawn from the top zone of the reactor compressed, cooled, optionally condensed and returned into the bottom zone of the reactor.

The present invention also relates to a use of an apparatus according to the present invention for producing olefin polymers.

Particle size distribution of the product polymer may be characterised, by indicating, both, the median particle size ($d_{50}$) and the span of the particle size distribution. The span is usually defined as $(d_{90}-d_{10})/d_{50}$, where $d_{90}$ is the particle size for which 90% by the weight of the particles have a diameter which is smaller than $d_{90}$; $d_{10}$ is the particle size for which 10% by the weight of the particles have a diameter which is smaller than $d_{10}$; and $d_{50}$ is the median particle size for which 50% by the weight of the particles have a diameter which is smaller than $d_{50}$.

The present text refers to diameter and equivalent diameter. In case of non-spherical objects the equivalent diameter denotes the diameter of a sphere or a circle which has the same volume or area (in case of a circle) as the non-spherical object. It should be understood that even though the present text sometimes refers to diameter, the object in question needs not be spherical unless otherwise specifically mentioned. In case of non-spherical objects (particles or cross-sections) the equivalent diameter is then meant.

As it is well understood in the art the superficial gas velocity denotes the velocity of the gas in an empty construction. Thus, the superficial gas velocity within the middle zone is the volumetric flow rate of the gas (in m$^3$/s) divided by the cross-sectional area of the middle zone (in m$^2$) and the area occupied by the particles is thus neglected.

The olefins polymerised in the process of the present invention are typically alpha-olefins having from 2 to 10 carbon atoms. Typically, the olefin gas is ethylene and/or propylene. Preferably the olefins are ethylene or propylene, optionally together with one or more other alpha-olefins having from 2 to 8 carbon atoms. Especially preferably the process of the present invention is used for polymerising ethylene, optionally with one or more comonomers selected from alpha-olefins having from 4 to 8 carbon atoms, such as 1-butene, 1-hexene or 1-octene; or propylene, optionally together with one or more comonomers selected from ethylene and alpha-olefins having from 4 to 8 carbon atoms, such as 1-butene, 1-hexene or 1-octene.

Typically the polymerisation is done in the presence of ethylene and an alpha-olefin comonomer, typically in the presence of ethylene and C4-C8 alpha-olefin comonomer, such as 1-butene, 1-hexene, 1-octene or combination of two or more comonomers.

Typically, the ratio of partial pressure of 1-butene to the partial pressure of ethylene in the polymerisation reactor is equal to or above 0.5. Typically the ratio of partial pressure of 1-hexene to the partial pressure of ethylene in the polymerisation reactor is equal to or above 0.25. The pressure of ethylene in the reactor is typically equal to or more than 3 bar. Partial pressures can be measured by collecting gas samples and analysing the samples by gas chromatography (GC). By GC analysis the molar fractions of the various gaseous components are obtained and, thus, their partial pressures. Increased monomer partial pressure means more yield from the reactor. This is especially beneficial in a loop reactor-gas phase reactor system, wherein the gas phase reactor is the limiting part of the process. In other words, if one is able to increase the yield of the gas phase reactor, one will be able to increase the yield of the whole process without sacrificing the production split between the loop reactor and the gas phase reactor. In this manner, higher yield of desired grades can be obtained.

By fluidisation gas is meant the gas comprising monomer, and optionally comonomer(s), chain transfer agent and inert components which form the upwards flowing gas in the fluidised bed reactor and in which the polymer particles are suspended in the fluidised bed. The unreacted gas is collected at the top of the reactor, compressed, also cooled, and returned to the bottom of the reactor. As it is understood by the person skilled in the art the composition of the fluidisation gas is not constant during the cycle. Reactive components are consumed in the reactor and they are added into the circulation line for compensating losses.

Unless specifically otherwise defined, the percentage numbers used in the text refer to percentage by weight.

The method of the present invention is typically a continuous method.

It has been found that the gas flow needed to obtain good conditions without excess entrainment of polymer from the bed, on one hand, and reduced adhesion of polymer on the walls, on the other hand, depends on the properties of the polymer powder. For reactors with L/D of the middle zone of 4 or greater, preferably 5 or greater it has now been found that the gas velocity should be chosen such that the dimensionless number, $N_{Br}$, is within the range of from 2.5 to 7, more preferably from 2.5 to 5. The number $N_{Br}$ can be calculated by using equation (I):

$$N_{Br} = \frac{\frac{d_{90} - d_{10}}{d_{50}}}{\frac{U_s}{U_t}} \quad (I)$$

In equation (I) $d_{90}$ denotes the smallest equivalent particle diameter such that 90% of all particles within the bed have a smaller equivalent diameter than $d_{90}$; $d_{10}$ denotes the smallest equivalent particle diameter such that 10% of all particles within the bed have a smaller equivalent diameter than $d_{10}$; $d_{50}$ represents the median equivalent particle diameter of the particles within the bed; $U_s$ is the superficial gas velocity within the middle zone; and $U_t$ is the terminal velocity of the particles within the reactor. According to Geldart (Gas Fluidisation Technology, John Wiley & Sons, 1986), equation 6.16, the terminal velocity in turbulent regime can be calculated from the equation (II) below:

$$U_t = \sqrt{\frac{4}{3} \cdot \frac{(\rho_p - \rho_g) \cdot g \cdot d_v}{K_N \cdot \rho_g}} \quad (II)$$

In equation (II) $\rho_p$ denotes the particle density (which is the mass of the particle divided by its hydrodynamic volume; the volume of eventual pores is included in the hydrodynamic volume, see explanations in section 6.12 of Geldart), $\rho_g$ is the density of the fluidisation gas, g is the gravity acceleration constant (9.81 m/s²), $d_v$ is the volume diameter of the particles (median volume diameter if the particles have different diameters), and $K_N$ is a correction factor. According to Geldart $K_N$ can be calculated from equation (III).

$$K_N = 5.31 - 4.88 \cdot \psi \quad (III)$$

In equation (III) $\psi$ denotes the ratio of the surface area of the equivalent volume sphere to the surface area of the particle, or $(d_v/d_s)^2$, where $d_v$ is the (median) volume diameter and $d_s$ is the (median) surface diameter of the particle (see Section 2.2 of Geldart).

The $d_{90}$, $d_{10}$ and $d_{50}$ values in the equation are suitably and preferably volume diameters and the percentages 90%, 10% and 50% are based on the mass of the particles. However, as the ratio is dimensionless it is not absolutely mandatory for $d_{90}$, $d_{10}$ and $d_{50}$ to represent the volume diameter, but they may also represent another, such as surface per volume or surface, diameter as long as they all represent the same diameter.

It has now been found that the number $N_{Br}$ is a useful characteristic to describe the fluidisation regime in the fluidised bed reactor. At low values of $N_{Br}$ the bed is in transport conditions. When $N_{Br}$ increases the bed goes over to fluidised conditions, first to entrained fluidisation, then bubbling fluidisation and finally minimum fluidisation.

For low values of $N_{Br}$ of less than 2.5 the bed is in transport conditions. Thereby a substantial entrainment of polymer from the bed takes place depending on particles' size and size distribution. Operation in this regime increases the risk of producing fines due to particle attrition. Powder mixing will be reduced as there is mainly conveying. Cyclone separation efficiency is also reduced and the risk of blocking solids transport line increases. On the other hand, for high values of $N_{Br}$ of greater than 7 the bed is in standard bubbling conditions and then mass and heat transfer within the bed remain insufficient. The solids mixing may be ineffective, increasing the risk of fouling and agglomeration of particles. The operation of the reactor may become less stable, leading to an increased risk of reactor shut-down.

Catalyst

The polymerisation is conducted in the presence of an olefin polymerisation catalyst. The catalyst may be any catalyst which is capable of producing the desired olefin polymer. Suitable catalysts are, among others, Ziegler-Natta catalysts based on a transition metal, such as titanium, zirconium and/or vanadium catalysts. Especially Ziegler-Natta catalysts are useful as they can produce olefin polymers within a wide range of molecular weight with a high productivity.

Suitable Ziegler-Natta catalysts preferably contain a magnesium compound, an aluminium compound and a titanium compound supported on a particulate support.

The particulate support can be an inorganic oxide support, such as silica, alumina, titania, silica-alumina and silica-titania. Preferably, the support is silica.

The average particle size of the silica support can be typically from 10 to 100 µm. However, it has turned out that special advantages can be obtained if the support has median particle size from 6 to 90 µm, preferably from 6 to 70 µm.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646. Alternatively, it can be prepared by first preparing a solution from the components and then contacting the solution with a carrier, as described in WO-A-01/55230.

Another group of suitable Ziegler-Natta catalysts contain a titanium compound together with a magnesium halide compound acting as a support. Thus, the catalyst contains a titanium compound on a magnesium dihalide, like magnesium dichloride. Such catalysts are disclosed, for instance, in WO-A-2005/118655 and EP-A-810235.

Still a further type of Ziegler-Natta catalysts are catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, wherein catalyst in the form of solid particles is formed. The principles of preparation of these types of catalysts are given in WO-A-2003/106510 of Borealis.

The Ziegler-Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, tri-hexylaluminium and tri-n-octylaluminium. Furthermore they include alkylaluminium oxy-compounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred activators are trialkylaluminiums, of which triethylaluminium, trimethylaluminium and tri-isobutylaluminium are particularly used. If needed the activator may also include an external electron donor. Suitable electron donor compounds are disclosed in WO-A-95/32994, U.S. Pat. Nos. 4,107,414, 4,186,107, 4,226,963, 4,347,160, 4,382,019, 4,435,550, 4,465,782, 4,472,524, 4,473,660, 4,522,930, 4,530,912, 4,532,313, 4,560,671 and 4,657,882. Also electron donors consisting of organosilane compounds, containing Si—OCOR, Si—OR, and/or Si—NR2 bonds, having silicon as the central atom, and R is an alkyl, alkenyl, aryl, arylalkyl or cycloalkyl with 1-20 carbon atoms are known in the art. Such compounds are described in U.S. Pat. Nos. 4,472,524, 4,522,930, 4,560,671, 4,581,342, 4,657,882, EP-A-45976, EP-A-45977 and EP-A-1538167.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

Also metallocene catalysts may be used. Metallocene catalysts comprise a transition metal compound which contains a cyclopentadienyl, indenyl or fluorenyl ligand. Preferably the catalyst contains two cyclopentadienyl, indenyl or fluorenyl ligands, which may be bridged by a group preferably containing silicon and/or carbon atom(s). Further, the ligands may have substituents, such as alkyl groups, aryl groups, arylalkyl groups, alkylaryl groups, silyl groups, siloxy groups, alkoxy groups or other heteroatom groups or the like. Suitable metallocene catalysts are known in the art and are disclosed, among others, in WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462 and EP-A-1739103.

Prior Polymerisation Stages

The polymerisation in the fluidised bed may be preceded by prior polymerisation stages, such as prepolymerisation or another polymerisation stage conducted in slurry or gas phase. Such polymerisation stages, if present, can be conducted according to the procedures well known in the art. Suitable processes including polymerisation and other process stages which could precede the polymerisation process of the present invention are disclosed in WO-A-92/12182, WO-A-96/18662, EP-A-1415999, WO-A-98/58976, EP-A-887380, WO-A-98/58977, EP-A-1860125, GB-A-1580635, U.S. Pat. Nos. 4,582,816, 3,405,109, 3,324,093, EP-A-479186 and U.S. Pat. No. 5,391,654. As it is well understood by the person skilled in the art, the catalyst needs to remain active after the prior polymerisation stages.

Fluidised Bed Polymerisation

In the fluidised bed polymerisation reactor the polymerisation takes place in a gas phase, in a fluidised bed formed by the growing polymer particles in an upwards moving gas stream. In the fluidised bed the polymer particles, containing the active catalyst, come into contact with the reaction gases, such as monomer, optionally comonomer(s) and optionally hydrogen which cause polymer to be produced onto the particles.

The polymerisation takes place in a reactor including a bottom zone, a middle zone and a top zone. The bottom zone forms the lower part of the reactor in which the base of the fluidised bed is formed. The base of the bed forms in the bottom zone with no gas distribution grid, fluidisation grid, or gas distribution plate, being present. Above the bottom zone and in direct contact with it is the middle zone. The middle zone and the upper part of the bottom zone contain the fluidised bed. Because there is no fluidisation grid there is a free exchange of gas and particles between the different regions within the bottom zone and between the bottom zone and the middle zone. Finally, above the middle zone and in direct contact therewith is the top zone.

As it is well understood by the person skilled in the art the entrainment rate of the polymer depends on the bed height and the fluidisation velocity. Typically, the powder entrainment flux is from 0.1 to 70 kg/(s·m$^2$), such as from 0.3 to 40 kg/(s·m$^2$), wherein the entrainment flux is given as the flow rate of the powder entrained from the reactor with the fluidisation gas (in kg/s) divided by the cross-sectional area of the pipe through which the fluidisation gas is withdrawn from the top of the fluidised bed reactor. The process of the present invention is especially useful when the entrainment flux is at the upper end of the range, such as from 0.5 to 30 kg/(s·m$^2$).

The bottom zone of the reactor suitably has a generally conical shape tapering downwards. Because of the shape of the zone, the gas velocity gradually decreases along the height within said bottom zone. The gas velocity in the lowest part is greater than the transport velocity and the particles eventually contained in the gas are transported upwards with the gas. At a certain height within the bottom zone the gas velocity becomes smaller than the transport velocity and a fluidised bed starts to form. When the gas velocity becomes still smaller the bed becomes denser and the polymer particles distribute the gas over the whole cross-section of the bed.

Preferably, the equivalent cross-sectional diameter of the bottom zone is monotonically increasing with respect to the flow direction of the fluidisation gas through the fluidised bed reactor. As the flow direction of the fluidisation gas is upwards with respect to the base, the equivalent cross-sectional diameter of the bottom zone is vertically monotonically increasing.

The bottom zone preferentially has straight circular cone shape. More preferably, the cone-angle of the cone-shaped bottom zone is 5° to 30°, even more preferably 7° to 25° and most preferably 9° to 18°, whereby the cone-angle is the angle between the axis of the cone and the lateral surface. It is not necessary in this preferred embodiment, however, that the bottom zone has the shape of a perfect cone but it may also have a shape of a truncated cone.

The bottom zone may also be seen as being constructed of a plurality of conical sections having different cone-angles. In such a case it is preferred that at least the conical section where the base of the fluidised bed is formed has the cone-angle within the above-specified limits. In a most preferred embodiment all the conical sections forming the bottom zone have the cone-angles within the above-specified limits. If the bottom zone comprises multiple conical sections it is then preferred that the steeper sections with a narrower cone angle are located at the lower end of the bottom zone and the sections with a wider cone angle are located at the higher end of the bottom zone. Such arrangement is believed to increase the shear forces at the wall of the reactor thus helping to prevent the polymer from adhering to the walls.

It is further preferred that the equivalent diameter of the bottom zone increases from about 0.1 to about 1 metres per one metre of height of the bottom zone (m/m). More preferably, the diameter increases from 0.15 to 0.8 m/m and in particular from 0.2 to 0.6 m/m.

The preferred cone-angles lead to additional improved fluidisation behaviour and avoid the formation of stagnant zones. As a result, the polymer quality and stability of the process are improved. Especially, a too wide cone-angle leads to an uneven fluidisation and poor distribution of the gas within the bed. While an extremely narrow angle has no detrimental effect on the fluidisation behaviour it anyway leads to a higher bottom zone than necessary and is thus not economically feasible.

It is possible that there is an at least one additional zone being located below the bottom zone. It is preferred that the at least one additional zone, or if there is more than one additional zone, the total of the additional zones contributes/contribute to a maximum of 15% to the total height of the reactor, more preferably 10% to the total height of the reactor and most preferably less than 5% of the total height of the reactor. A typical example for an additional zone is a gas entry zone.

The fluidised bed reactor of the present invention comprises no gas distribution grid or plate. The even distribution of the fluidisation gas within the bed is achieved by the shape of the bottom zone. The omission of the gas distribution grid reduces the number of locations where fouling and chunk formation can start. The terms gas distribution grid or gas distribution plate or fluidisation grid are used synonymously to denote a metal plate or a construction within the reactor which has a purpose of distributing the fluidisation gas evenly throughout the cross-sectional area of the reactor. In the reactors where a gas distribution grid is used it generally forms the base of the fluidised bed.

The middle zone of the fluidised bed reactor has a generally cylindrical shape. Preferably it will be in the form of a straight circular cylinder being denoted herein simply cylinder. From a more functional perspective, the middle zone will essentially form a domain wherein the superficial velocity of the fluidisation gas is essentially constant.

The middle zone typically contains most of the fluidised bed. While the bed extends also to the bottom and top zones, its major part is within the middle zone.

The middle zone has a ratio of the height over diameter (L/D) of at least about 4, preferably at least about 5. The height over diameter is typically not more than 15, preferably not more than 10.

The gas velocity within the middle zone is such that an effective circulation of solids is achieved. This leads to good heat and mass transfer within the bed, which reduce the risk of chunk formation and fouling. Especially, good powder flow near the walls of the reactor has been found to reduce the adhesion of polymer at the wall of the reactor. Suitably the superficial velocity of the fluidisation gas is within the range of from 0.35 to 1.0 m/s. The process of the present invention is especially useful when the superficial velocity of the fluidisation gas is within the range of from 0.40 to 0.9 m/s, preferably from 0.45 to 0.90 m/s, especially preferably from 0.50 to 0.90 m/s and in particular from 0.55 to 0.90 m/s.

The height L of the middle zone is the distance of the lowest point of the generally cylindrical part of the reactor to the highest point of the generally cylindrical part of the reactor. The lowest point of the generally cylindrical part is the lowest point above which the diameter of the reactor no longer increases with the height of the reactor but remains constant. The highest point of the generally cylindrical part is the lowest point above which the diameter of the reactor no longer remains constant with the height of the reactor but decreases. The diameter D of the middle zone is the (equivalent) diameter of the reactor within the generally cylindrical part.

The top zone of the reactor is shaped such that a gas-particle stream vicinal to the inner walls is created, whereby the gas-particle stream is directed downwards to the base. This gas-particle stream leads to an excellent particle-gas distribution and to an excellent heat transfer. Further the high velocity of the gas and particles vicinal to the inner walls minimizes lump- and sheet formation. The top zone suitably has a generally conical, upwards tapering shape. It is further preferred that the ratio of the height of the top zone to the diameter of the middle zone is within the range of from 0.3 to 1.5, more preferably 0.5 to 1.2 and most preferably 0.7 to 1.1.

It is particularly preferred that the cone forming the top zone is a straight circular cone and the cylinder forming the middle zone preferably is a circular cylinder. More preferably the cone-angle of the cone-shaped top zone is 10° to 50°, most preferably 15 to 45°. As defined above, the cone-angle is the angle between the axis of the cone and the lateral area.

The specific cone-angles of the cone-shaped upper zone further improve the tendency for back-flow of the particles counter current to the fluidisation gas. The resulting unique pressure balance leads to an intensive break up of bubbles, whereby the space-time-yield and solids concentration are further increased. Further as mentioned above, the wall flow velocity, i.e., the velocity of particles and gas vicinal to the inner walls is high enough to avoid the formation of lumps and sheets.

In a preferred embodiment the reactor used for the method of the present invention has a top zone which has a generally conical, upwards tapering shape, a middle zone in direct contact with and below said top zone which has a generally cylindrical shape, and a bottom zone indirect contact with and below the middle zone, which has a generally conical shape tapering downwards.

Separation of Fines

The upwards moving gas stream is established by withdrawing a fluidisation gas stream from the top zone of the reactor, typically at the highest location. The gas stream withdrawn from the reactor is then directed to a suitable process unit for removing fines. Examples of such units include for example cyclone.

The present invention typically comprises at least one cyclone connected in series with the fluidised bed polymerisation reactor.

A cyclone in its simplest form is a container in which a rotating flow is established. Cyclone design is well described in the literature. Particularly suitable cyclones are described in documents Kirk-Othmer, Encyclopaedia of Chemical Technology, $2^{nd}$ edition (1966), Volume 10, pages 340-342

Agglomerates Removal

Typically in the stream comprising fluidisation gas and agglomerates of olefin polymer, the $d_{50}$ of particles, i.e. agglomerates and/or catalyst particles is typically above 25 mm.

According to an embodiment of the invention the agglomerates of olefin polymer that can be formed during the dynamic operation are separated from the fluidisation gas and withdrawn from the bottom zone of the reactor, typically by using an agglomerate trap.

Withdrawal of Agglomerates

The agglomerates eventually present in the reactor may be withdrawn by using an agglomerate trap below the bottom zone and suitably below the base of the fluidised bed. After recovering the agglomerates may be disposed of or they may be crushed and mixed with the product.

When the agglomerates reach a certain size they no longer remain fluidised by the fluidisation gas but start falling downwards in the bed. When they are big enough they fall through the bottom zone to the agglomerate trap. The critical size depends on the fluidisation velocity, on one hand, and the density of the fluidised bed, on the other hand. Especially the density of the bed has a strong effect on the residence time of the agglomerates in the bed before they drop out of the bed. In the normal operation conditions as described above, for instance a bed density between 180 and 320 $kg/m^3$ and the fluidisation velocity in the middle zone between 0.55 and 0.95 m/s, the residence time of the agglomerates in the bed is typically not more than 300 seconds and preferably not more than 180 seconds. Usually the agglomerate does not drop instantaneously through the bed but remains there at about 5 seconds, minimum.

The agglomerate trap typically comprises a cylinder which is isolated from the bottom zone and the downstream equipment, for instance, by two valves. The valves are operated in sequence to allow filling and emptying of the cylinder.

The content of agglomerates in the trap, or a process variable which indicates the content of the agglomerates, is measured. Such measurement may include the measurement of the density of the contents of the agglomerate trap, for instance by radioactive measurement.

Another option is to measure the temperature in the agglomerate trap. The polymer and polymer agglomerates still contain active catalyst and therefore they are heated by the heat of the polymerisation. The inventors have found that the temperature in the agglomerate trap may increase substantially when the trap contains agglomerates, for instance by at least 2.5° C., or by at least 3° C., such as from 4° C. to 30° C. or even more, or from 5° C. to 20° C., or even more. The advantage of the temperature measurement is that the measurement is not hazardous, it is cheap and easy to implement and the accuracy is good.

Instead of measuring the temperature in the agglomerate trap it is also possible to measure a temperature difference, for instance, between the temperature in the agglomerate trap and the bottom zone of the reactor, or the difference in the temperatures in the agglomerate trap during two different process steps.

The opening and closing of the isolation devices, such as valves, is suitably controlled by a sequence controller. According to one suitable mode of operation the connection to the bottom zone of the reactor is kept open. At a suitable point of time the connection is closed and discharging of the agglomerate trap to the downstream process is activated. When the discharge is completed then the connection to the bottom zone of the reactor is reopened.

According to one preferred embodiment the opening and closing of the valves may be controlled so that when the measurement indicates the presence of agglomerates in the agglomerate trap then the connection to the bottom zone is closed and the discharge is activated. When the discharge is completed the connection to the bottom zone is reopened.

According to another preferred embodiment the sequence controller, such as a programmable logic controller, keeps the connection to the bottom zone open for a predetermined period. After the lapse of the period the connection to the bottom zone is closed and the discharge activated. When the discharge is completed the connection to the bottom zone is reopened.

It is important that during the operation of the process the connection between the agglomerate trap and the bottom zone of the reactor, on one hand, and the discharge of the agglomerate trap, on the other hand, are not open simultaneously. If they were, they would allow the discharge of a large amount of gas from the reactor, resulting in unstable process.

It is possible to introduce pressurised gas via a separate line to the agglomerate trap for flushing the trap. The pressurised gas can be inert gas, such as nitrogen, or it may be the circulation gas from the circulation gas line which returns the fluidisation gas from the top of the reactor to the bottom thereof.

As the person skilled in the art understands, the agglomerate trap, including the connection lines and the valves, must be designed to allow the flow of the agglomerates from the bottom zone to the trap. Also it must be possible to discharge the agglomerates from the agglomerate trap. Typically the agglomerates have a size of from 25 to 100 mm, or even greater. The design should thus allow the removal of at least 25 mm objects. Suitably the minimum diameter of the pipes and equipment in the agglomerate trap is at least 50 mm, preferably at least 100 mm and more preferably at least 150 mm.

Product Withdrawal

The polymer product stream is withdrawn from the reactor. Typically it is preferred to withdraw polymer from the middle zone of the reactor.

The polymer is withdrawn from the middle zone in any manner known in the art, either intermittently or continuously. It is preferred to withdraw the polymer continuously because then the conditions in the reactor fluctuate less than with intermittent withdrawal. Both methods are well known in the art. Continuous withdrawal is disclosed, among others, in WO-A-00/29452, EP-A-2330135 and EP-A-2594433. Intermittent withdrawal is disclosed, among others, in U.S. Pat. No. 4,621,952, EP-A-188125, EP-A-250169 and EP-A-579426.

In a preferred continuous withdrawal method the polymer is withdrawn through an open pipe. In one preferred embodiment the pipe is equipped with a control valve which position is automatically adjusted to maintain a desired outflow rate. The valve position may be set, for instance, by the reactor bed level controller. In another preferred embodiment the pipe discharges the polymer to a vessel, the pressure of which is controlled to maintain a desired pressure difference between the reactor and the vessel. The pressure difference then sets the polymer flow rate from the reactor to the vessel.

According to an embodiment of the invention the olefin polymer product stream having a narrow particle size distribution is further subjected to downstream processes, such as removal of hydrocarbons in the post-reactor treatment stage, mixing with additives and extrusion.

Post-Reactor Treatment

When the polymer has been removed from the polymerisation reactor it is subjected to process steps for removing residual hydrocarbons from the polymer. Such processes are well known in the art and can include pressure reduction steps, purging steps, stripping steps, extraction steps and so on. Also combinations of different steps are possible.

According to one preferred process a part of the hydrocarbons is removed from the polymer powder by reducing the pressure. The powder is then contacted with steam at a temperature of from 90 to 110° C. for a period of from 10 minutes to 3 hours. Thereafter the powder is purged with inert gas, such as nitrogen, over a period of from 1 to 60 minutes at a temperature of from 20 to 80° C.

According to another preferred process the polymer powder is subjected to a pressure reduction as described above. Thereafter it is purged with an inert gas, such as nitrogen, over a period of from 20 minutes to 5 hours at a temperature of from 50 to 90° C. The inert gas may contain from 0.0001 to 5%, preferably from 0.001 to 1%, by weight of components for deactivating the catalyst contained in the polymer, such as steam.

The purging steps are preferably conducted continuously in a settled moving bed. The polymer moves downwards as a plug flow and the purge gas, which is introduced to the bottom of the bed, flows upwards.

Suitable processes for removing hydrocarbons from polymer are disclosed in WO-A-02/088194, EP-A-683176, EP-A-372239, EP-A-47077 and GB-A-1272778.

After the removal of residual hydrocarbons the polymer is preferably mixed with additives as it is well known in the art. Such additives include antioxidants, process stabilizers, neutralizers, lubricating agents, nucleating agents, pigments and so on.

The polymer particles are mixed with additives and extruded to pellets as it is known in the art. Preferably a counter-rotating twin screw extruder is used for the extrusion step. Such extruders are manufactured, for instance, by Kobe and Japan Steel Works. A suitable example of such extruders is disclosed in EP-A-1600276.

The present invention relates further to an apparatus of producing polymer particles.

The description and parameters as well as the equipment described above and relating to the method of the present invention relates also to the arrangement disclosed above.

DESCRIPTION OF DRAWINGS

The FIGURE shows an example embodiment of a rector system according to the present invention. The reactor (1) has a bottom zone (3), a middle zone (2) and a top zone (4). The reactor is also equipped with a number of temperature measurement sensors (5) distributed (not necessarily even) throughout the reactor length capable of measuring the temperature at different reactor zones. The reactor has a temperature set point pre-selected on the basis of the polymer to be produced. The fluidisation gas is introduced into the bottom zone (3) through the line (16). While the gas flows upwards through the bottom zone (3) its superficial velocity reduces due to the increasing diameter. A fluidised bed starts to form within the bottom zone (3). The gas continues to travel upwards through the middle zone (2) where the gas velocity is constant and the bed is fully formed. Finally the gas reaches the top zone (4) from where together with entrained solids, passes along line (6) to a cyclone (7).

The cyclone (7) removes the entrained solids from the circulation gas which is passed through the gas outlet (8) to a compressor (not shown in the FIGURE) and then to a cooler (not shown in the FIGURE) and from the cooler the gas introduced to the reactor (1) through the line (16). The cyclone area can consist of more than one separation stages (i.e., more than one cyclone connected in series) to efficiently remove all the entrained particulate material (not shown in the FIGURE).

The solid stream is passed from the cyclone (7) and to lines (9) via rotary feeders (not shown in the FIGURE) or any other powder feed arrangements to control the solids flow rate (not shown in the FIGURE). Downstream of the rotary feeders (not shown in the FIGURE) there is a three-way valve (10) which direct the powder stream either via the line (11) to downstream process stages or return the powder stream into the reactor (2) along line (12).

The polymer product is withdrawn from the reactor (1) along one or more outlets (15). Catalyst, optionally dispersed within polymer particles from a preceding polymerisation stage, is introduced into the reactor (1) along line (13).

Agglomerates are withdrawn from the bottom zone of the reactor (14) by using an agglomerate trap (not shown in the FIGURE).

EXAMPLES

In the following the symbols have the meaning of H2 means hydrogen, C2 ethylene, C3 propane and C4 1-butene.

Example 1

Ziegler Natta catalyst particles exhibiting a size distribution with dl0 equal to 10 µm, d50 equal to 25 µm, and d90 equal to 40 µm, (i.e., span=1.0) were polymerised in a continuous polyethylene pre-polymerisation reactor at temperature equal to 70° C. and pressure equal to 65 barg using propane as solvent (2300 kg/h), 350 Kg/h ethylene feed rate, 0.1 KgH2/tnC3, 40 KgC4/tnC3 for a mean residence time of 30 minutes and with a mean measured catalyst activity equal to 2 Kg/gcat/h. Subsequently, the polymer material was transferred to a slurry loop reactor where it polymerised at temperature equal to 85° C. and pressure equal to 63 barg with hydrogen to ethylene ratio (expressed as mol per kmol) equal to 300 (H2/C2=300), 1-butene to ethylene ratio (expressed as mol per kmol) equal to 600 (C4/C2=600) with a solids concentration in the slurry-phase loop reactor equal to 37%-weight for a mean residence time of 60 minutes and with a mean measured catalyst activity equal to 18 Kg/gcat/h. After the loop reactor the residual hydrocarbons were flushed out and the polymer particles were transferred to a conventional bubbling fluidised gas-phase reactor (GPR) equipped with a distribution plate and having internal diameter equal to 4.0 m and cylindrical section height equal to 15 m. The superficial gas velocity was equal to 0.5 m/s and the polymerisation carried out at temperature equal to 85° C. and overall pressure equal to 19 barg. 4.5 bar ethylene partial pressure was used and 1-butene was also added (co-polymerisation conditions). The hydrogen to ethylene ratio (expressed as mol per kmol) was equal to 8 (H2/C2=8) and the 1-butene to ethylene ratio (expressed as mol per kmol) equal to 100 (C4/C2=100). In the GPR the polymer particles were polymerised for a mean residence time equal to 2 hours and with a mean measured catalyst activity equal to 14 Kg/gcat/h. The d90 of the polymer particles produced in the gas phase reactor were measured and it was equal to 2000 µm. During the dynamic operation of the reactor some of the temperature measurements increased up to 6° C. above the set-point temperature (i.e., 85° C.), however, no severe operability issues were observed and no significant agglomerates were detected.

TABLE 1

Summary of polymerisation run.

| $d_{90}$ | $P_{C2}$ (bar) | C4/C2 (kmol/mol) | DT (° C.) | Operability |
|---|---|---|---|---|
| 2000 | 4.5 | 100 | 6 | Smooth, no agglomerates |

Example 2

The first example was repeated with the only difference being the operating conditions in the conventional bubbling fluidised gas-phase reactor (GPR). Thus, the polymerisation carried out at temperature equal to 85° C. and overall pressure equal to 19 barg. 4.5 bar ethylene partial pressure was used and 1-butene was also added (co-polymerisation conditions). The hydrogen to ethylene ratio (expressed as mol per kmol) was equal to 8 (H2/C2=8) and the 1-butene to ethylene ratio (expressed as mol per kmol) equal to 650 (C4/C2=650). In the GPR the polymer particles were polymerised for a mean residence time equal to 2 hours and with a mean measured catalyst activity equal to 18 Kg/gcat/h. The $d_{90}$ of the polymer particles produced in the gas phase reactor were measured and it was equal to 2350 μm. During the dynamic operation of the reactor some of the temperature measurement points increased up to 15° C. compared to the set-point temperature (i.e., 85° C.), severe operability issues were faced and significant agglomerates were detected.

TABLE 2

Summary of polymerisation run.

| $d_{90}$ | $P_{C2}$ (bar) | C4/C2 (kmol/mol) | DT (° C.) | Operability |
|---|---|---|---|---|
| 2350 | 4.5 | 650 | 15 | Unstable with agglomerates |

Example 3 (Inventive)

The second example was repeated with the only difference that after the flashing step the polymer particles were fed to a gas-phase reactor having conical bottom and top zones in the absence of distribution plate and having an internal diameter equal to 3.6 m and cylindrical section height equal to 16 m. The superficial gas velocity was equal to 0.7 m/s and the polymer particles were polymerised for a mean residence time equal to 1.5 hours and with a mean measured catalyst activity equal to 18 Kg/gcat/h. The $d_{90}$ of the polymer particles produced in the gas-phase reactor were measured and it was equal to 1850 μm. During the dynamic operation of the reactor none of the temperature measurement points in the reactor increased more than 6° C. compared to the set-point temperature (i.e., 85° C.). It was not observed any operability issue and no significant agglomerates were detected.

TABLE 3

Summary of polymerisation run.

| $d_{90}$ | $P_{C2}$ (bar) | C4/C2 (kmol/mol) | DT (° C.) | Operability |
|---|---|---|---|---|
| 1850 | 4.5 | 650 | 6 | Stable, no agglomerates |

Example 4 (Inventive)

The third example was repeated with the only difference that in the gas-phase reactor the 1-butene to ethylene ratio (expressed as mol per kmol) equal to 950 (C4/C2=950). The superficial gas velocity was equal to 0.7 m/s and the polymer particles were polymerised for a mean residence time equal to 1.5 hours and with a mean measured catalyst activity equal to 20 Kg/gcat/h. The $d_{90}$ of the polymer particles produced in the gas phase reactor were measured and it was equal to 1970 μm. During the dynamic operation of the reactor none of the temperature measurement points increased more than 9° C. compared to the set-point temperature (i.e., 85° C.). It was not experienced severe operability issues and no significant agglomerates were detected.

TABLE 4

Summary of polymerisation run.

| $d_{90}$ | $P_{C2}$ (bar) | C4/C2 (kmol/mol) | DT (° C.) | Operability |
|---|---|---|---|---|
| 1970 | 4.5 | 950 | 9 | Stable, no agglomerates |

Example 5 (Inventive)

The first example was repeated with the only difference being the operating conditions in the conventional bubbling fluidised gas-phase reactor (GPR). Thus, the polymerisation carried out at temperature equal to 85° C. and overall pressure equal to 19 barg. 4.0 bar ethylene partial pressure was used and 1-hexene was also added (co-polymerisation conditions). The hydrogen to ethylene ratio (expressed as mol per kmol) was equal to 8 (H2/C2=8) and the 1-hexene to ethylene ratio (expressed as mol per kmol) equal to 50 (C6/C2=50). In the GPR the polymer particles were polymerised for a mean residence time equal to 2 hours and with a mean measured catalyst activity equal to 15 Kg/gcat/h. The $d_{90}$ of the polymer particles produced in the gas phase reactor were measured and it was equal to 2390 μm. During the dynamic operation of the reactor some of the temperature measurement points increased up to 9.5° C. compared to the set-point temperature (i.e., 85° C.), some operability issues were experienced and a small number of agglomerates were detected.

TABLE 5

Summary of polymerisation run.

| $d_{90}$ | $P_{C2}$ (bar) | C6/C2 (kmol/mol) | DT (° C.) | Operability |
|---|---|---|---|---|
| 2390 | 4.0 | 50 | 9.5 | Stable with some agglomerates |

Example 6 (Comparative)

The first example was repeated with the only difference being the operating conditions in the conventional bubbling fluidised gas-phase reactor (GPR). Thus, the polymerisation carried out at temperature equal to 85° C. and overall pressure equal to 19 barg. 4.0 bar ethylene partial pressure was used and 1-hexene was also added (co-polymerisation conditions). The hydrogen to ethylene ratio (expressed as mol per kmol) was equal to 8 (H2/C2=8) and the 1-hexene to ethylene ratio (expressed as mol per kmol) equal to 200 (C6/C2=200). In the GPR the polymer particles were polymerised for a mean residence time equal to 2 hours and with a mean measured catalyst activity equal to 19 Kg/gcat/h. The $d_{90}$ of the polymer particles produced in the gas phase reactor were measured and it was equal to 2450 µm. During the dynamic operation of the reactor almost all of the temperature measurement points shown temperature increase up to 17.0° C. compared to the set-point temperature (i.e., 85° C.), significant some operability issues were experienced and a large number of agglomerates were detected.

TABLE 6

Summary of polymerisation run.

| $d_{90}$ | $P_{C2}$ (bar) | C6/C2 (kmol/mol) | DT (° C.) | Operability |
|---|---|---|---|---|
| 2450 | 4.0 | 200 | 17 | Unstable with agglomerates |

Example 7 (Inventive)

The fifth example was repeated with the only difference that after the flashing step the polymer particles were fed to a gas-phase reactor having conical bottom and top zones in the absence of distribution plate and having an internal diameter equal to 3.6 m and cylindrical section height equal to 16 m. The superficial gas velocity was equal to 0.7 m/s and the polymer particles were polymerised for a mean residence time equal to 1.5 hours and with a mean measured catalyst activity equal to 15 Kg/gcat/h. The $d_{90}$ of the polymer particles produced in the gas phase reactor were measured and it was equal to 1930 µm. During the dynamic operation of the reactor none of the temperature measurement ponts shown temperature increases of more than 5° C. compared to the set-point temperature (i.e., 85° C.). It was not observed any operability issue and no significant agglomerates were detected.

TABLE 7

Summary of polymerisation run.

| $d_{90}$ | $P_{C2}$ (bar) | C6/C2 (kmol/mol) | DT (° C.) | Operability |
|---|---|---|---|---|
| 1930 | 4.0 | 50 | 6 | Stable, no agglomerates |

Example 8 (Inventive)

The fifth example was repeated with the only difference that in the gas-phase reactor the 1-hexene to ethylene ratio (expressed as mol per kmol) equal to 300 (C6/C2=300). The superficial gas velocity was equal to 0.7 m/s and the polymer particles were polymerised for a mean residence time equal to 1.5 hours and with a mean measured catalyst activity equal to 23 Kg/gcat/h. The $d_{90}$ of the polymer particles produced in the gas phase reactor were measured and it was equal to 2120 µm. During the dynamic operation of the reactor none of the temperature measurements shown temperature increases of more than 8.5° C. compared to the set-point temperature (i.e., 85° C.). It was not experienced severe operability issues and no significant agglomerates were detected.

TABLE 8

Summary of polymerisation run.

| $d_{90}$ | $P_{C2}$ (bar) | C6/C2 (kmol/mol) | DT (° C.) | Operability |
|---|---|---|---|---|
| 2120 | 4.0 | 300 | 8.5 | Stable, no agglomerates |

It will be obvious to person skilled in the art that, as the technology advances, the inventive concept can be implemented in various ways. The invention and its embodiments are not limited to the examples above but may vary within the scope of the claims.

The invention claimed is:

1. An olefin polymerisation method comprising polymerising at least one olefin in gas phase in a fluidised bed in the presence of an olefin polymerisation catalyst in a polymerisation reactor having a vertical body; a generally conical downwards tapering bottom zone; a generally cylindrical middle zone, above and connected to said bottom zone; and a generally conical upwards tapering top zone above and connected to said middle zone wherein (i) fluidisation gas is introduced to the bottom zone of the polymerisation reactor from where it passes upwards through the polymerisation reactor; (ii) the fluidisation gas is withdrawn from the top zone of the polymerisation reactor; (iii) a fluidised bed is formed within the reactor where the growing polymer particles are suspended in the upwards rising gas stream; and wherein the polymerisation reactor has an operating temperature set point and which polymerisation reactor comprises at least one temperature measurement sensor, wherein a temperature difference (DT) between each temperature measurement sensor (Tm), and the operating temperature set point (Ts) of the reactor is equal to or less than 10° C., and wherein the polymerisation reactor comprises polymer particles having a $d_{90}$ of equal to or more than 700 µm.

2. The method according to claim 1 wherein the polymerisation reactor has a superficial gas velocity, which is chosen such that a dimensionless number $N_{Br}$ is in the range or from 2.5 to 7.

3. The method according to claim 1, wherein the polymerisation reactor has a height to diameter ratio L/D of at least 4.

4. The method according to claim 1, wherein there is no fluidisation grid in the polymerisation reactor.

5. The method according to claim 1, wherein the fluidisation gas withdrawn from the top zone of the polymerisation reactor is compressed, cooled, optionally condensed and returned into the bottom zone of the polymerisation reactor.

6. The method according to claim 1, wherein the olefin gas is ethylene and/or propylene.

7. The method according to claim 1, wherein the polymerisation is done in the presence of an alpha-olefin comonomer.

8. The method according to claim 1, wherein the ratio of partial pressure of 1-butene to the partial pressure of ethylene in the polymerisation reactor is equal to or above 0.5.

9. The method according to claim 1, wherein the ratio of partial pressure of 1-hexene to the partial pressure of ethylene in the polymerisation reactor is equal to or above 0.25.

10. The method according to claim 1, wherein the pressure of ethylene in the reactor is equal to or more than 3 bar.

11. An apparatus comprising a polymerisation reactor for polymerising at least one olefin in gas phase in a fluidised bed in the presence of an olefin polymerisation catalyst, the polymerisation reactor having a vertical body; a generally conical downwards tapering bottom zone; a generally cylindrical middle zone, above and connected to said bottom zone; and a generally conical upwards tapering top zone above and connected to said middle zone wherein (i) means for introducing fluidisation gas to the bottom zone of the polymerisation reactor from where it passes upwards through the polymerisation reactor; (ii) means for withdrawing the fluidisation gas from the top zone of the polymerisation reactor; (iii) a fluidised bed within the polymerisation reactor where the growing polymer particles are suspended in the upwards rising gas stream; and wherein the polymerisation reactor has an operating temperature set point and which polymerisation reactor comprises at least one temperature measurement sensor, wherein a temperature difference (DT) between each temperature measurement sensor (Tm) and the operating temperature set point of the reactor (Ts) is equal to or less than 10° C., and wherein the polymerisation reactor comprises polymer particles having a $d_{90}$ of equal to or more than 700 μm.

12. A process comprising producing olefin polymer with the apparatus of claim 11.

13. The method according to claim 7, wherein the polymerisation is done in the presence of C4-C8 alpha-olefin comonomer.

14. The method according to claim 13, wherein the polymerisation is done in the presence of 1-butene, 1-hexene, 1-octene or combination of two or more comonomers.

* * * * *